United States Patent [19]
Bella et al.

[11] Patent Number: 5,630,227
[45] Date of Patent: May 13, 1997

[54] SATELLITE RECEIVER HAVING ANALOG-TO-DIGITAL CONVERTER DEMODULATION

[75] Inventors: Luigi Bella, Noordwijk aan Zee; Javier V.-T. Bosch, Katwijk; Irene Echaniz-Elgarresta, Leiden, all of Netherlands; Gerhard Hoffmann, Uhldingen-Mühlhofen, Germany

[73] Assignee: Agence Spatiale Europeenne, Paris Cedex, France

[21] Appl. No.: 575,911

[22] Filed: Dec. 20, 1995

Related U.S. Application Data

[63] Continuation of Ser. No. 212,900, Mar. 14, 1994, abandoned.

[30] Foreign Application Priority Data

Mar. 17, 1993 [FR] France .................................... 93 03067

[51] Int. Cl.$^6$ ..................................................... H04B 1/30
[52] U.S. Cl. ........................ 455/324; 455/12.1; 455/313; 375/316
[58] Field of Search ................... 455/12.1, 13.1, 455/13.2–13.4, 313, 323, 324, 337, 272, 273, 132, 137, 303, 307, 334; 329/304, 208; 375/279, 324, 329–331, 316, 349, 350

[56] References Cited

U.S. PATENT DOCUMENTS

| | | | |
|---|---|---|---|
| 4,121,165 | 10/1978 | Dogliotti et al. | 329/50 |
| 4,144,495 | 3/1979 | Metzger | 455/13.3 |
| 4,628,506 | 12/1986 | Sperlich | 455/13.3 |
| 5,140,694 | 8/1992 | Benden | 455/12.1 |
| 5,151,926 | 9/1992 | Chennakeshu et al. | 375/84 |
| 5,557,642 | 9/1996 | Williams | 375/316 |

FOREIGN PATENT DOCUMENTS 3107630   9/1982   Germany.

OTHER PUBLICATIONS

J. G. Proakis, "Digital Communications," Second Edition, McGraw-Hill Book Company, New York, New York, USA, 1989, pp. 53–54.

F. Ananasso, et al., "On-Board Processing Concepts for Multibeam Communication Satellites: Present Situation and Perspectives," *Alta Frequenza*, vol. 57, No. 10, 1988, Milano, Italy, pp. 535–544.

J. M. Kappes, et al., "Programmable Demultiplexer/Demodulator Processor," IEEE Military Communications Conference, vol. 1, No. 7.3, Jul. 1990, Monterey, California, USA, pp. 230–234.

*Primary Examiner*—Reinhard J. Eisenzopf
*Assistant Examiner*—Doris To
*Attorney, Agent, or Firm*—Barry R. Lipsitz; Ralph F. Hoppin

[57] ABSTRACT

A satellite receiver is provided which downconverts an incoming band of signals received at a carrier frequency to a signal spectrum centered about an intermediate frequency (IF). The IF signal spectrum is filtered to provide a group of signals therefrom. The group comprises a subset of all the signals in the incoming band of signals. The group of signals from the IF signal spectrum is sampled at a high frequency which is greater than the highest frequency present in the group but lower than the intermediate frequency, in order to provide the group of signals at baseband directly from the IF signal spectrum.

5 Claims, 2 Drawing Sheets

SATELLITE RECEIVER HAVING ANALOG-TO-DIGITAL CONVERTER DEMODULATION

This application is a continuation of commonly assigned, U.S. patent application Ser. No. 08/212,900 filed Mar. 14, 1994, now abandoned.

The present invention relates to a telecommunication signal receiver intended, in particular, for use on board a satellite.

BACKGROUND OF INVENTION

A typical receiver of a satellite with multispot coverage and OBP aims at delivering to each on-board demodulator the baseband image of the groups of RF signals received from each spot beam. A conventional RF receiver consists of at least as many input chains as beams and each chain typically includes a low noise amplifier, an automatic gain controller, an input filter, a first down-conversion unit to intermediate frequency with IF amplifier, at least one group filter to filter the incoming signal groups, a second down-conversion unit to convert down the selected group of signals to a second intermediate frequency, and an analog-to-digital converter. The receiver possibly includes a switching matrix for switching the signals over the different parallel channels.

The circuitry of such a signal receiver is complex and heavy because the required functions of amplification and conversion to baseband are complicated for the following reasons:

(i) the need of providing frequency conversion for each group of signals in each beam, the need of ensuring a high assignment flexibility which requires several reference frequencies to be provided for the various down conversions depending on the traffic needs and avoiding interferences with adjacent systems;

(ii) the requirement for a complex down conversion scheme, in particular to meet the prescribed phase noise requirements when using several reference frequencies as indicated above;

(iii) the requirement of providing intermediate amplification stages with sophisticated automatic gain controlers, due to the complexity and the large number of devices implied by the above requirements (i) and (ii).

SUMMARY OF INVENTION

The present invention aims at simplifying the signal receiver circuitry so as to substantially reduce the dimensions and weight of the receiver, thereby to make it particularly suitable for use on board a communication satellite with on-board signal processing.

To attain this object, the invention provides a radio frequency signal receiver arranged such that after down-conversion of the incoming signal to a predetermined intermediate frequency band, each IF signal group is sampled at the same sampling clock frequency in order to provide a baseband spectrum signal for each group of signals.

By virtue of the invention, a baseband spectrum output is obtained directly from the IF spectrum without requiring a second down-conversion using variable reference frequencies, thereby allowing a fast analog-to-digital converter to be used for each receive chain.

Furthermore, a harmonic of the reference frequency can be used as local frequency for the down-conversion to IF spectrum if the central frequency of the RF spectrum meets a simple relation.

In this case, the overall frequency generation scheme in the whole receiver is reduced to a single fixed frequency generator associated with a frequency divider. Such a frequency generation scheme allows excellent phase noise performances. Further, this frequency generation scheme can be implemented using solely digital techniques on a digital clock which is currently made available in OBP satellites payloads.

The resulting simplification in the design of the receiver circuitry makes it possible to implement compact integrated receivers, which in turn leads to a significant reduction in payload mass and volume. As stated above, this result is particularly valuable in the case of receivers with a very large number of spots. This case is likely to be useful on board future communication satellites intended to provide a large coverage.

BRIEF DESCRIPTION OF DRAWINGS

The invention is set forth in more details hereinafter with reference to the accompanying drawings.

In the drawings.

DESCRIPTION OF THE PREFERRED EMBODIMENT

Figure 1:
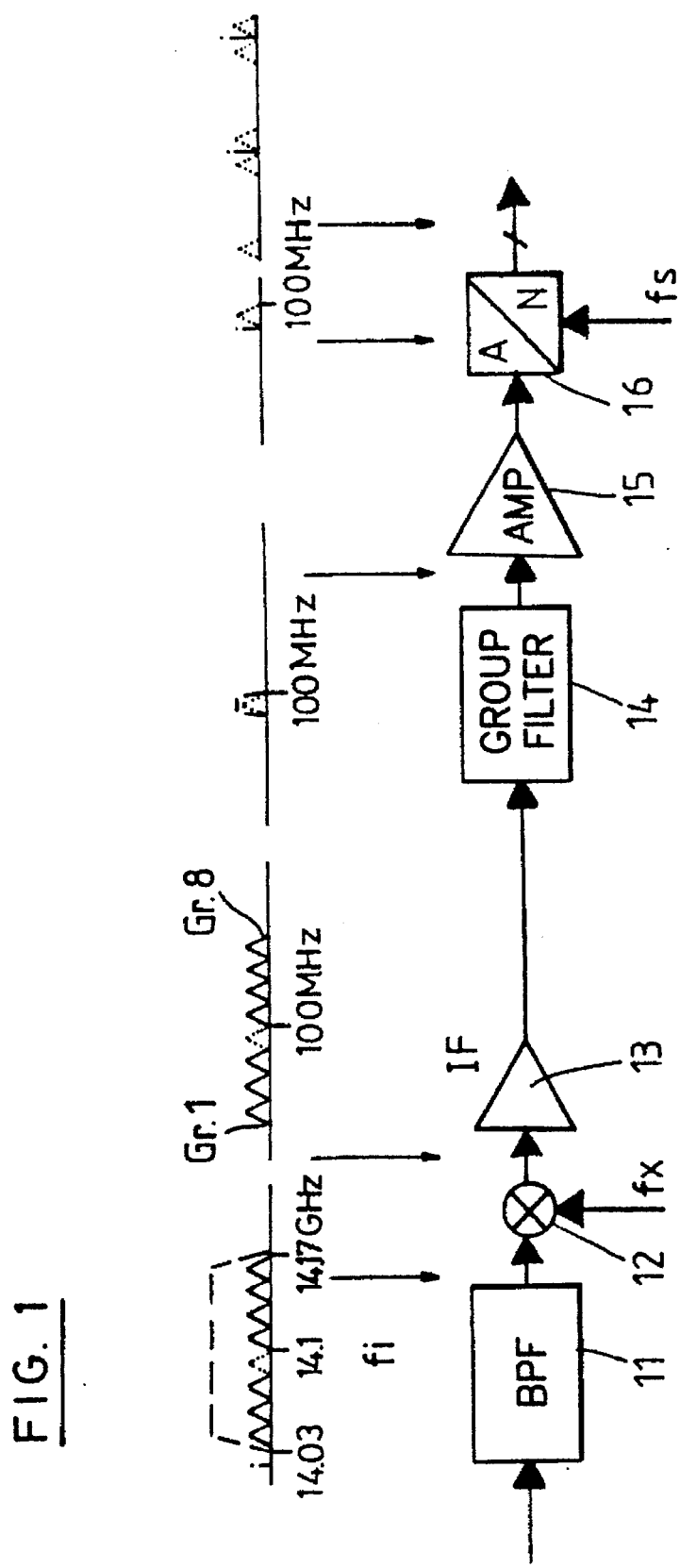
FIG. 1 is a block diagram of a signal receiver in accordance with the invention.

In the receiver according to the invention the incoming broadband signal of each beam is translated to an intermediate frequency IF as in a conventional receiver. In FIG. 1 there is shown the band-pass filter 11, the mixer 12 and an IF amplifier 13. A group filter 14 ensures discrimination between the different groups of signals. The group filter is followed by an amplifier 15.

After this stage, the frequency generation scheme of each receiving chain in accordance with this invention, departs from the conventional scheme. When a conventional receiving chain comprises means to convert down each signal group to a second intermediate frequency before applying the signals to an analog-to-digital converter, the invention provides to directly sampling each IF signal group delivered by the group filter by performing a sub-sampling process using a fast analog-to-digital converter.

Sub-sampling technique is known per se; it consists in sampling a bandlimited signal at a high sampling rate chosen close enough in relation to the highest frequency present in the signal. This digitizing process allows bandlimited high frequency signals to be reconstructed efficiently if the sampling frequency satisfies the Nyquist criterium, well known to persons skilled in the art.

Figure 2:
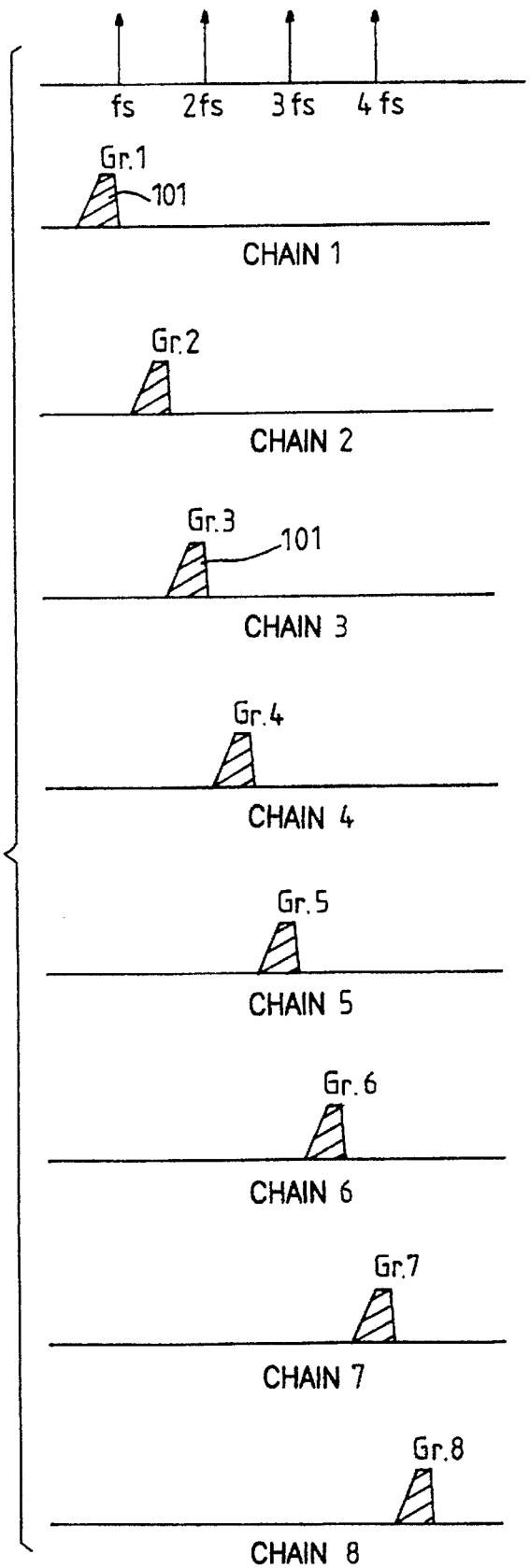
FIG. 2 is a diagram illustrating the sampling technique in frequency domain as implemented in a signal receiver according to the invention.
Figure 2:
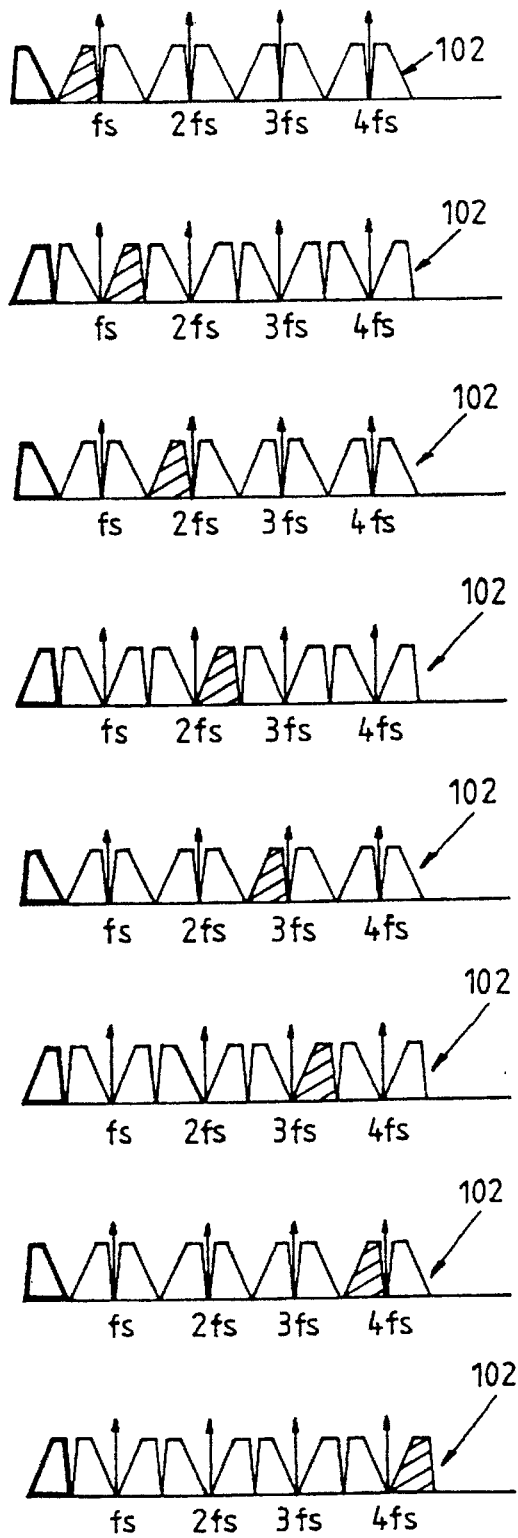

In accordance with the invention, the analog-to-digital converter 16 in each receiving chain receives the same IF spectrum, the mixers 12 of all the chains operate at the same local frequency $f_x$, and all the converters 16 are provided to operate at the same sampling frequency $f_s$. In this case, it has been observed that one of the shifted frequency spectrum always falls at baseband, that is a frequency band comprised between 0 and $f_s/2$. The diagram of FIG. 2 shows the frequency spectra in a 14 GHz band width for example. Each signal has a band-width equal to $f_s/2$ with a sampling frequency $f_s$ of about 40 MHz and continuous bandwidth for all the signal groups, which leads to a total bandwidth of 4 $f_s$. The frequency spectra are centered around $f_i$=14.1 GHz at the receiver input.

In the eight receiving chains, the signals are downconverted to the IF intermediate frequency spectrum using the same local frequency $f_x=f_i-2.5\,f_s$. All the IF spectra are equal but in each chain, they contain different useful groups of signals to be extracted (crosshatched spectra 101 in FIG. 2). The signals are sampled at the same sampling rate $f_s$ in the converters 16 of all the chains. The spectra 102 represent the frequency spectra obtained at the outputs of the eight converters.

It is seen that the frequency spectra with solid contour in each group all fall at baseband. These spectra may thus be provided directly to a digital demodulator.

By virtue of the invention, it is possible to use fast A/D converters to provide directly the baseband signals for input to the demodulators.

In addition, a harmonic of the reference frequency $0.5\,f_s$ may be used as local frequency $f_x$ for the down conversion to intermediate frequency if the center frequency $f_i$ of the RF spectrum is such that $f_i=n\,f_s+0.5\,f_s$ (where n is an integer).

Therefore, the overall frequency generation scheme in the whole receiver can be reduced to a single fixed frequency generator associated with a divider to generate the frequency $0.5\,f_s$. Such a frequency generating circuitry provides reduced phase noise. Also, this frequency generation scheme can be implemented using solely digital techniques on a digital reference clock which is currently available on OBP satellite payloads.

The design simplification of the receiver circuitry which results from the invention makes it possible to implement compact integrated receivers, which in turn leads to a significant reduction in payload mass and volume. As stated above, this result is particularly valuable in the case of receivers with a very large number of spots. This case is likely to be useful on board future communication satellites intended to provide a large coverage.

We claim:
1. A radio frequency (RF) receiver comprising:
   means for downconverting an incoming band of signals received at a carrier frequency to a downconverted signal having a frequency spectrum centered about an intermediate frequency (IF);
   said downconverted signal comprising a plurality of bandlimited components with a reference bandwidth equal to the bandwidth of the largest of said bandlimited components;
   means for filtering said downconverted signal to provide a plurality of filtered signals corresponding to said plurality of bandlimited components; and
   means for substantially concurrently sampling said plurality of filtered signals at a sampling frequency ($f_s$) which is at least the Nyquist rate for said reference bandwidth but lower than the Nyquist rate for said downconverted signal, in order to provide said plurality of filtered signals at baseband directly from said downconverted signal.
2. A receiver as defined in claim 1 wherein:
   said filtering means and said sampling means comprise a plurality of receiving chains, each chain includes filtering the downconverted signal to provide one of said plurality of filtered signals; and
   each chain includes sampling means operating at the same sampling frequency ($f_s$) to provide said one of said plurality of filtered signals at baseband directly from the downconverted signal.
3. A receiver as defined in claim 2 wherein the sampling means of each chain comprises an analog-to-digital converter.
4. A receiver as defined in claim 1 wherein said means for sampling comprises an analog-to-digital converter.
5. A receiver as defined in claim 1 wherein said means for downconverting comprises a mixer using a frequency ($f_x$) which is a harmonic of a reference frequency, $0.5 \times f_s$.

* * * * *